(No Model.) 2 Sheets—Sheet 1.
W. VOGLER.
DRESS FORM.
No. 408,769. Patented Aug. 13, 1889.
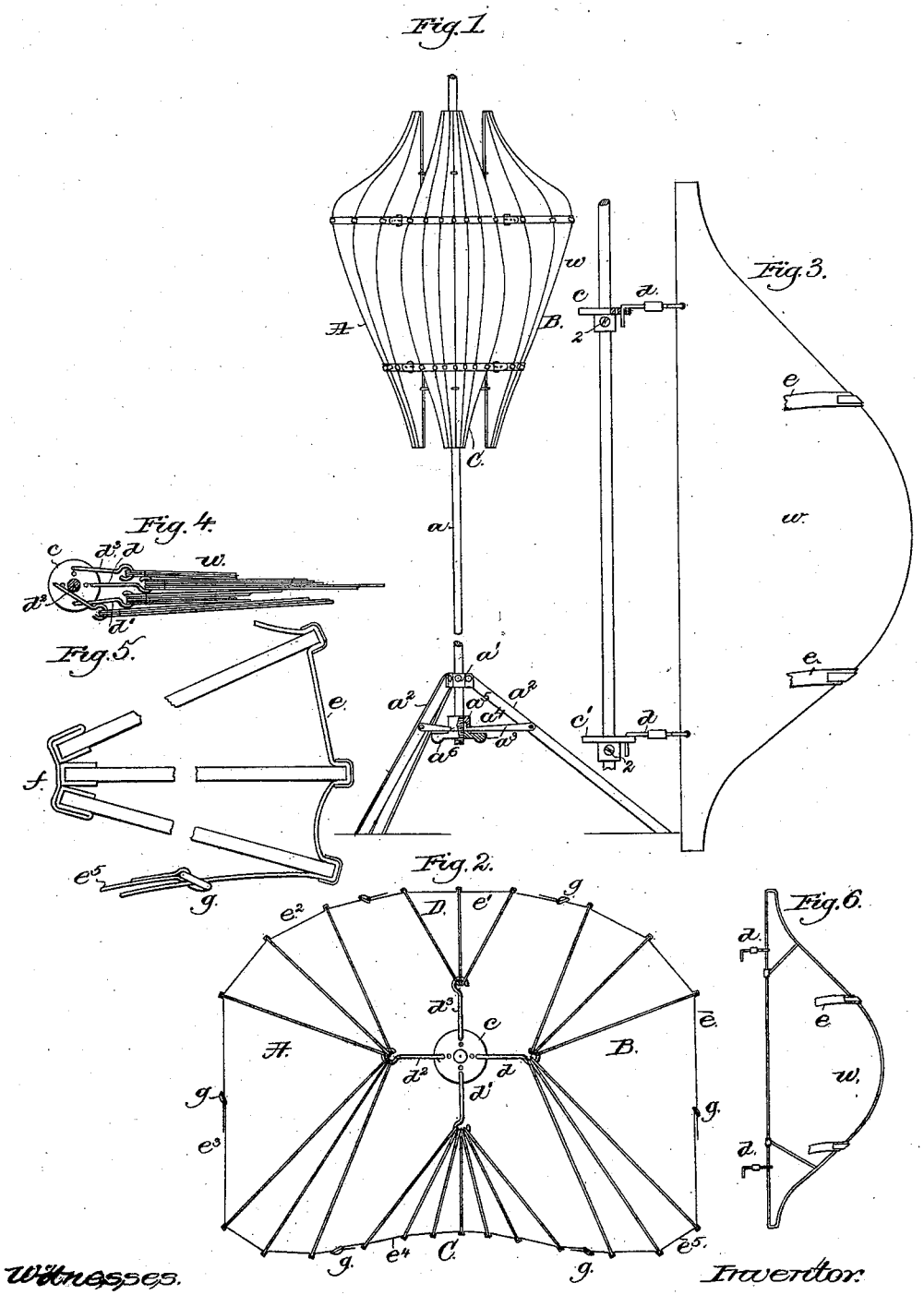

(No Model.) 2 Sheets—Sheet 2.
W. VOGLER.
DRESS FORM.
No. 408,769. Patented Aug. 13, 1889.
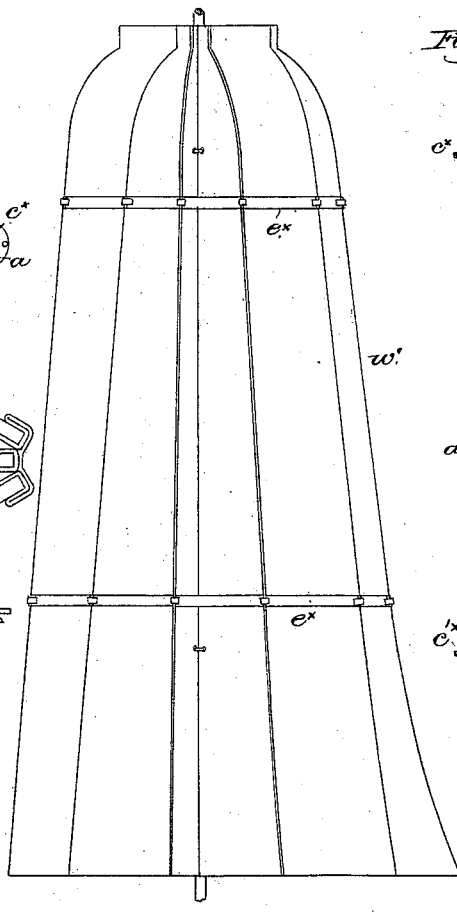
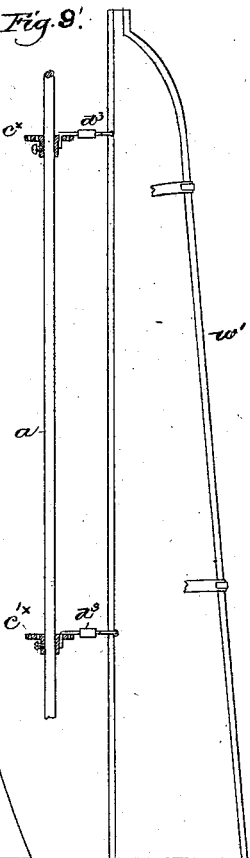
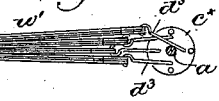
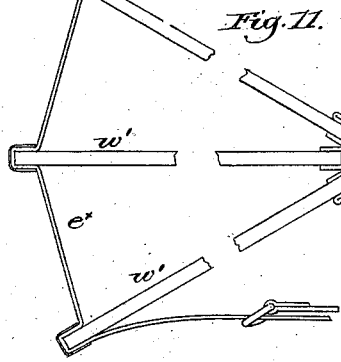
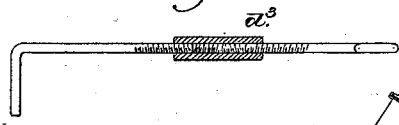
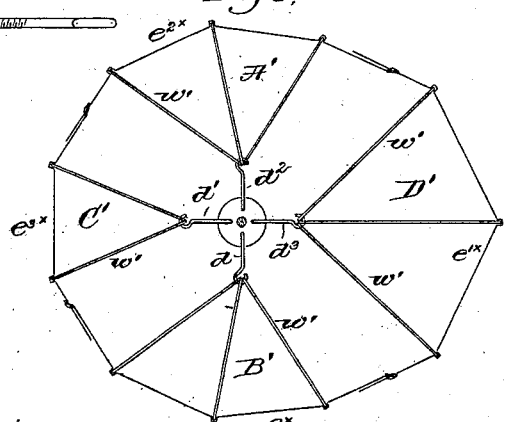
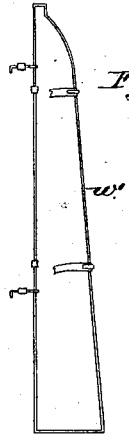
Witnesses
Edgar A. Goddin
Frederick L. Emery
Inventor
William Vogler
by Crosby & Gregory
Attys.

UNITED STATES PATENT OFFICE.

WILLIAM VOGLER, OF SOMERVILLE, MASSACHUSETTS.

DRESS-FORM.

SPECIFICATION forming part of Letters Patent No. 408,769, dated August 13, 1889.

Application filed August 25, 1888. Serial No. 283,746. (No model.)

*To all whom it may concern:*

Be it known that I, WILLIAM VOGLER, of Somerville, county of Middlesex, State of Massachusetts, have invented an Improvement in Form for Wearing-Apparel, of which the following description, in connection with the accompanying drawings, is a specification, like letters on the drawings representing like parts.

This invention has for its object the production of a simple and serviceable form for wearing-apparel which may be readily expanded or contracted or adjusted to desired shape both as to size and contour, the said form being also so constructed that it may readily be folded up when not in use.

My invention therefore consists, essentially, in the combination, with a supporting-rod, of a series of independently-movable folding sections, each section consisting of separable wings, and pivotally supported on or with relation to the said rod, the separate wings of the section varying in shape and being independently movable with relation to each other.

The particular features of my invention will be further pointed out in the following specification and referred to in the claim.

Figure 1, in elevation, represents the bust portion of a dress-form embodying my invention, the skirt portion of the form being omitted to save space on the drawing and avoid confusion; Fig. 2, a plan or top view of Fig. 1, enlarged; Fig. 3, an enlarged detail showing one of the wings and its pivotal supports connected with the holding-plate on the rod or standard. Fig. 4 is a detail in plan view showing the bust-form of Fig. 1 collapsed. Fig. 5 is an enlarged detail of one of the sections, showing the same as connected or hinged together at their inner ends and adjustably connected together at their outer ends by a strap, so as to swing the sections more or less, according to the shape desired for the bust in cross-section. Fig. 6 is a modified form of wing to be described. Fig. 7 represents the skirt portion of the dress-form removed from Fig. 1; Fig. 8, a top or plan view of the parts shown in Fig. 7. Fig. 9 is a detached view of one of the wings of the skirt-form detached and its supports. Fig. 10 is a detail showing the sections and wings collapsed, but with the straps omitted. Fig. 11 shows three wings and their connections. Fig. 12 is a modified form of wing for the skirt-form. Fig. 13 is a detail, enlarged, of one of the pivotal connections.

The standard or rod $a$ has fixed to it near its lower end a collar $a'$, to which is pivoted a series of feet $a^2$, each foot having a link $a^3$ pivoted to it, and provided at its inner end with a lip, as $a^4$, which is made to enter a groove or space, as best shown in Fig. 1, of a nut $a^5$ on the said rod, the said lips being held in engagement with the said nut $a^5$ by a thumb-nut $a^6$, screwed upon the rod $a$. These links by unscrewing the thumb-nut may be readily disengaged from the said nut, so as to fold the tripod-feet parallel to the rod $a$ when the form is not in use.

The upper portion of the rod $a$ has secured to it in an adjustable manner, or by a screw, as 2, two holding plates or blocks $c$ $c'$, which, as shown, (see Figs. 2 and 4,) are provided with a series of holes or openings to provide for the adjustable connection with them loosely of the series of like pivots $d$ $d'$ $d^2$ $d^3$, which in turn support and serve as bearings, on or with relation to which the sets of wings A B C D turn or may be adjusted.

The sets of wings A and B are alike, and, as shown, are composed of six separate wings of varying shape, the said wings and all the wings of the other set of wings being, however, substantially of like shape at and near their upper and lower ends, but varying in curvature between their upper and lower ends according to the particular part of the bust-form with which the particular wing is to be used and to the shape desired for bust at a particular portion thereof where the said wing is to be held to give form in curvature to the bust. The wings entering into the two sections A B, forming the sides, shoulders, and parts of the breast, are alike.

The section C is shown as having seven wings and as forming the main part of the front of the bust, while the section D, forming the central part of the back, is shown as composed of three wings. I do not desire to limit my invention to any particular number of wings in each section nor to any particular shape for the wings, for it is obvious that their shape and number may be variously modified without departing from my invention, some being made to represent slender and other stout forms more or less developed, each bust-form being adjustable within certain limits as to diameter, and the wings, by their adaptability to be swung, affording considerable range of change as to the cross-section of the bust.

In Figs. 1 to 5, inclusive, the wings are supposed to be of paper or other board or sheet metal, whereas in Fig. 6 the wing is shown as composed of wire properly joined together and braced for strength. The wings of each section are in practice joined or hinged together at their inner edges, and, as shown on an enlarged scale in Fig. 5, the said hinge $f$ is supposed to be of cloth or leather or thin metal properly secured to the wings, so that the wings of the different sections may be swung or turned on the pivots uniting them to the plates and also opened or closed with relation to each other.

To provide for changing the relative position of the sections with relation to each other or for portions of the wings of a section with relation to other wings of the same section, I have connected to the outer edges of the wings adjusting-straps, as $e$ $e^2$ $e^3$ $e^4$ $e^5$, which are joined, as herein shown, by buckles $g$ or equivalents, whereby the effective length of each of the said straps may be made shorter or longer, and thus locate any particular section of wings or the part of a section of wings in any desired position with relation to the rod $a$. It will be noticed that the pivots $d$ $d'$ $d^2$ $d^3$ turn on or with relation to the plates $c$ $c'$, and to enable all the sections to be closed and brought together at one side of the rod $a$ the said pivots have been made of sufficient length between their ends to swing clear of the plates $c$ $c'$, as in Fig. 4.

I have so far described the bust portion of the form.

In practice the rod $a$ will have attached to it below the bust a skirt-distending portion or form; but I wish it to be understood that the bust might be employed alone or the skirt-form to be described might be used alone.

In this present application, to avoid making the drawings on so small a scale that the parts would not be readily distinguishable, I have placed the skirt portion of the form on a second sheet of drawings; Figs. 1 and 7 superimposed or put in line with the rods $a$ fastened together would complete the full form.

Referring now briefly to Figs. 7 to 12, showing the skirt-form, it will be seen that in it the separate wings $w'$ are arranged in sections, as A' B' C' D', below the sections marked A, B, C, and D; but in the skirt-form the section C' has, as shown, but two wings, while the sections A', B', and D' have three. The wings $w'$ are shaped differently from the wings $w$ of the bust, it being understood that the wings are so shaped at their outer edge that a cross-section of the form in the bust or skirt portion will present the contour desired at that point. The wings $w'$ are supported at their inner edges near each end by means of pivots or arms engaging suitable collars or projections $c^\times$ $c'^\times$, secured to the rod $a$, and the wings are hinged together at their inner edges and connected together at their outer edges by straps, (marked $e^\times$ $e'^\times$ $e^{2\times}$ $e^{3\times}$,) substantially as are connected together the wings $w$ of the bust, there being, as shown, two sets of such straps; or they may be cords or webbing connected with both the bust and skirt portion. The pivotal connections between the rod and the wings may and preferably will be made in two parts, so that they may be adjusted to lengthen or shorten them to aid in giving to the wings any desired pitch or inclination. Fig. 13 shows one of these pivotal connections in section and enlarged.

When paper-board or other thin material is used for the wings, the edges of the material will be bound in usual manner for strength.

I claim—

1. In a dress-form for wearing-apparel, a supporting-rod combined with a series of independently-movable folding sections, each section consisting of separable wings and pivotally supported independently of each other on or with relation to the said rod, substantially as described.

2. In a form for wearing-apparel, a supporting-rod combined with a series of folding sections containing wings, substantially as described, and pivoted on or with relation to the said rod, the separate wings of the sections varying in shape and being independently movable with relation to each other, substantially as described.

3. The supporting-rod and the folding sections pivotally and independently connected thereto, combined with the adjusting-straps to connect the outer edges of the wings of the sections and vary their distance apart individually or the sections one from the other, substantially as described.

4. The supporting-rod and the sections containing wings $w$ $w'$, pivotally supported on the said rod and swinging independently thereon, the said wings being collected in folding sections to constitute both the bust and skirt portion, and being adjustable toward or from the said rod in the direction of their length to vary their inclination thereto, substantially as described.

In testimony whereof I have signed my name to this specification in the presence of two subscribing witnesses.

WILLIAM VOGLER.

Witnesses:
G. W. GREGORY,
B. DEWAR.